Nov. 13, 1951  J. SELZ ET AL  2,575,073
AMPLIFYING VOLTMETER WITH A LOGARITHMIC SCALE
Filed May 12, 1948  2 SHEETS—SHEET 1
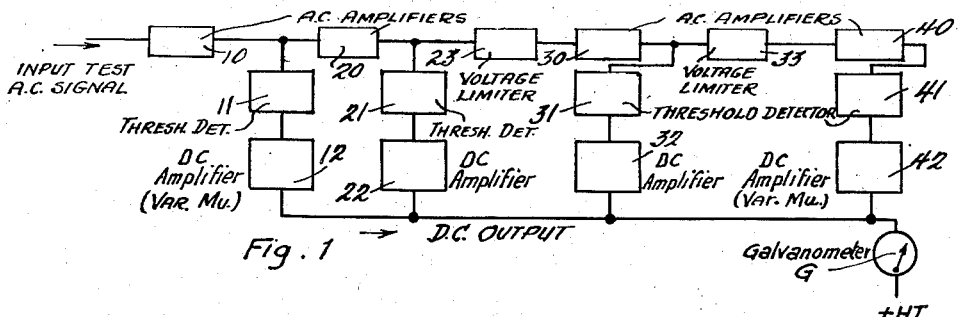
Fig. 1
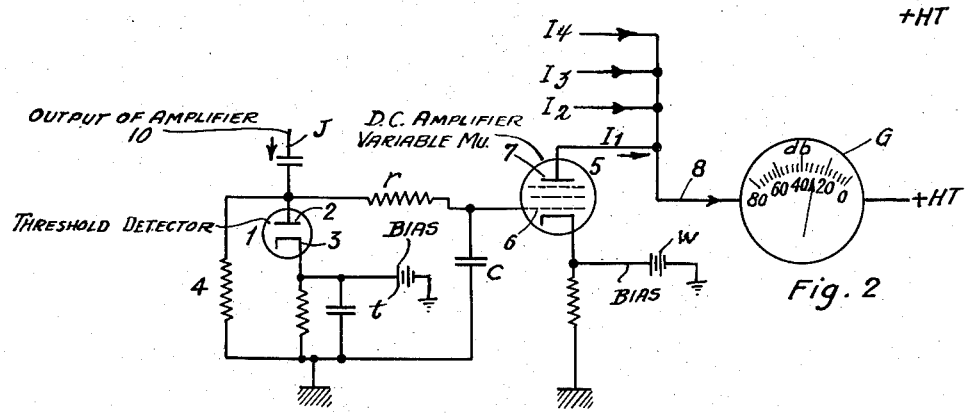
Fig. 2
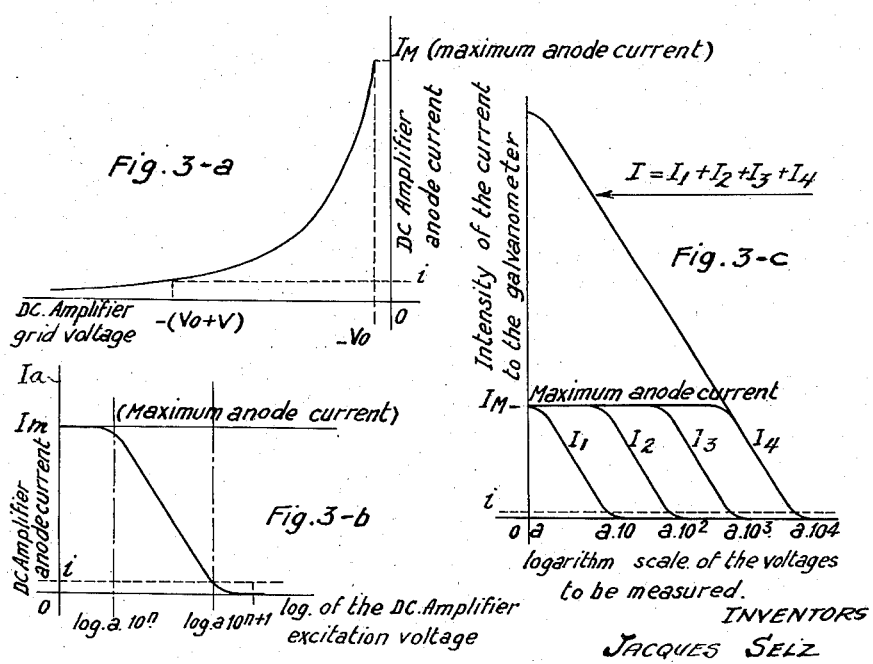
Fig. 3-a
Fig. 3-b
Fig. 3-c
INVENTORS
JACQUES SELZ
ALEXANDRE DE LEUDEVILLE
By Adams & Buch
ATTORNEYS Patented Nov. 13, 1951

2,575,073

UNITED STATES PATENT OFFICE 2,575,073

AMPLIFYING VOLTMETER WITH A LOGARITHMIC SCALE

Jacques Selz and Alexandre de Leudeville,
Paris, France

Application May 12, 1948, Serial No. 26,634
In France May 13, 1947

4 Claims. (Cl. 171—95)

In order to obtain sufficiently precise readings when voltages to be measured vary within wide limits (for example, from a few microvolts to a few volts) without being subjected to any operation such as is required for the recording of the readings, it has been proposed to provide a voltmeter with a logarithmic response curve. The relative precision of the apparatus thus produced is constant whatever may be the value of the voltage to be measured: the instrument dial carries a graduation which is preferably either in decibels or in Napiers.

Such apparatus has already been proposed, but the range of measurement appeared to be of insufficient extent, and the purpose of the present invention is to supply for the engineer an apparatus the principle of which allows adapting it without fundamental modification to any desired range of voltages.

This present invention therefore relates to a voltmeter with a logarithmic scale for the measurement upon a single scale, of alternating voltages varying within wide limits, characterised in that it comprises substantially a multi-stage amplifier constituted of several amplifier stages connected in series and to which is applied the alternating voltage to be measured, an individual liminal value detector connected to the output of each amplifier stage, for deriving a portion of the current passing through the series of stages, and, at the output of each such liminal value detector, an individual direct current amplifier, formed by a tube of which the anode current-control grid voltage characteristic is logarithmic.

If it is a problem of measuring for example a range of voltages ranging between the values $a$ and $ak^n$ volts, the number of such amplifier stages will be equal to $n$ and the amplification factor of each of them with the possible exception of the first one will be equal to $k$.

To simplify the description which follows, it will be assumed that the range of voltages to be measured is represented by the interval from $a$ to $10,000a$ microvolts, that is, 80 decibels: there will be four separate alternating current amplifier stages each with an individual gain of 20 decibels, except for the initial input amplifier stage, the gain of which will be specified later. Thus, the range to be measured is from the value $a$ to a value $ak^n$ equal to a $.10^4$.

At the output of each alternating current amplifier stage there is provided according to this invention a direct current detector-amplifier system; each such direct current detector-amplifier system supplies direct current varying as a function of the peak value of the alternating voltage applied thereto and is arranged in such manner that:

(1) Below a certain liminal value $v_1$ of the peak alternating voltage applied thereto, the output direct current I of the detector-amplifier of that stage is constant and equal to a certain maximum value $I_M$.

(2) For the values of the peak alternating voltage comprised between the value $v_1$ and a higher value $v_2$ the output direct current I decreases from $I_M$ to a zero value.

Thus there are four units of amplifier-detectors each of which individually delivers a derived direct current varying as hereinbefore mentioned. The four currents from these four separate amplifier detectors pass in the same direction, and are added in the input of the measuring-indicating or recording apparatus which may be of galvanometer type.

The assembly of direct current detector-amplifier units, is arranged in such manner that for any value of the applied alternating voltage to be measured taken in the measuring range, there is one given single detector-amplifier which is controlled by a peak value of the applied alternating voltage comprised between values of $v_1$ and $v_2$ and therefore delivers a direct current I whose value is between the values 0 and $I_M$, the detectors more remote from the point of application of the voltage to be measured, delivering a negligible current, and those nearer the point of application of the voltage to be measured supplying a direct current whose value is equal to $I_M$.

The designation "active amplifier" will be given to an amplifier unit delivering an output direct current whose value is between the values 0 and $I_M$: when the current delivered is negligible, the amplifier unit will be termed "saturated," and when this current is equal to $I_M$ the amplifier unit will be termed "inert."

For each value of the voltage to be measured or to be recorded, lower than or equal to the value $a$ microvolts, the four direct current amplifiers are inert, the galvanometer or indicating instrument therefore receives current of the value of $4I_M$.

For an applied alternating voltage V comprised between $a$ and $10a$ the fourth detector is active owing to the gain of the four alternating current amplifiers, and the indicating instrument G is traversed by an output current $3I_M+I$: this current becomes $3I_M$ when the voltage V becomes equal to $10a$.

When the applied voltage V is between $10a$ and 100a, the fourth direct current amplifier unit is saturated, while the third is active owing to the gain of the first three alternating current amplifiers; the indicating instrument therefore receives current of the value of $2I_M+I$ which becomes $2I_M$ when the applied voltage $V=100a$.

When the voltage V is between 100a and 1000a, the two final direct current amplifier units are saturated and the second is active, the instrument therefore receives current of the value of $I_M+I$, and finally receives current of the value $I_M$ when the applied voltage V is equal to 1000a.

Finally when the applied voltage V is between 1000a and 10,000a, the three final direct current amplifier units are saturated, and the first is active, the indicating instrument is therefore traversed by current of a value I which becomes zero when the voltage V is equal to 10,000a.

To sum up, the scale reading or deflection of the galvanometer instrument varies by quantities which are equal for values of applied voltages which vary in equal ratios, that is, in geometrical progression. The response of the apparatus is exactly logarithmic for the applied voltage values a, 10a, 100a and so forth which correspond to the application of the respective liminal values of the actual inputs of the various detectors.

In the intervals between these specific values, deflections will be produced of values related approximately logarithmically by employing as direct-current amplifiers according to this present invention, variable mu vacuum tubes the anode current-control grid voltage characteristic of which is close to a logarithmic curve for constant value of anode voltage. It follows from this that a scale graduation reading in decibels between 0 and 20, or between 20 and 40, and so on, will present fairly equal divisions.

In reality the characteristics of the variable mu vacuum tubes are not logarithmic over their whole extent, but have a curvature in one direction for the current I below a very small value close to $I_M$, and a curvature in the other direction for $I_i$. In practice, for an applied voltage close to the values 10a, 100a or 1000a, two detector-amplifier units will deliver the current. By the combined effect of the two curves of opposite curvature, the variation of the current remains logarithmic for these values of voltages. There results a scale in decibels which is almost exactly linear except, it will be appreciated, for the limit values a and 10,000a for which this compensation is not produced, which causes slight irregularities at the start and end of the scale.

It has been stated above that the initial alternating current input amplifier stage has a gain different from 20 db. In fact, in the frequency band considered, this input amplifier stage gives the gain necessary to obtain proper operation for the maximum voltage 10,000a to be measured or to be recorded (10,000a) to correspond to the reduction to substantially zero from the value $4T_M$ of the total output direct current, the value $4I_M$ corresponding to an applied voltage equal to or less than the lowest value a of the voltage range to be measured or recorded. A voltage ten times weaker than 10,000a, that is, 1000a, should attain the liminal level of the first detector, that is, it should apply to this detector a value which is just high enough to make this detector start to become active.

If the value of the voltage at the bottom of the scale a is taken for instance as equal to 10 microvolts (effective) then there will be in this case $1000a=0.01$ effective volts applied at the input of the initial alternating current amplifier. If the liminal value of each detector be fixed at 0.5 direct current volt (peak for alternating current) the alternating voltage applied to this detector is to be equal in principle to $$\frac{0.5}{\sqrt{2}}$$

effective volts. In reality, to take into account the voltage efficiency of rectification of this detector assumed to be close to 0.7, that is, the ratio of the direct current voltage at the output of the detector to the peak input voltage of the detector, this voltage must be equal to 0.5 effective volts. The initial alternating current input amplifier stage must therefore give voltage an amplification equal to $$\frac{0.5}{0.01}$$

that is, a gain in decibels of about $$20 \log \frac{0.5}{0.01} = 34 \text{ decibels}$$

This ratio of 50 whose logarithm is taken is determined as the ratio of the desired liminal value of the input alternating voltage of the detector 0.5 volt, to the assumed effective value 0.01 volt at the input of the initial alternating current amplifier.

In general, the gain of the first initial alternating current amplifier stage will be represented by $(20+Y)$ db, where Y is a difference factor determined in the manner just explained.

The arrangement of the apparatus will now be described for an applied voltage interval of 80 db. with reference to the accompanying drawings wherein:

Fig. 1 is a block diagram showing the general plan of the arrangement of the various parts of the voltmeter system.

Fig. 2 is the circuit arrangement of a liminal detector with its associated direct current amplifier.

Figs. 3a, 3b, 3c are graphs of the principal characteristics of the system.

Figure 5:
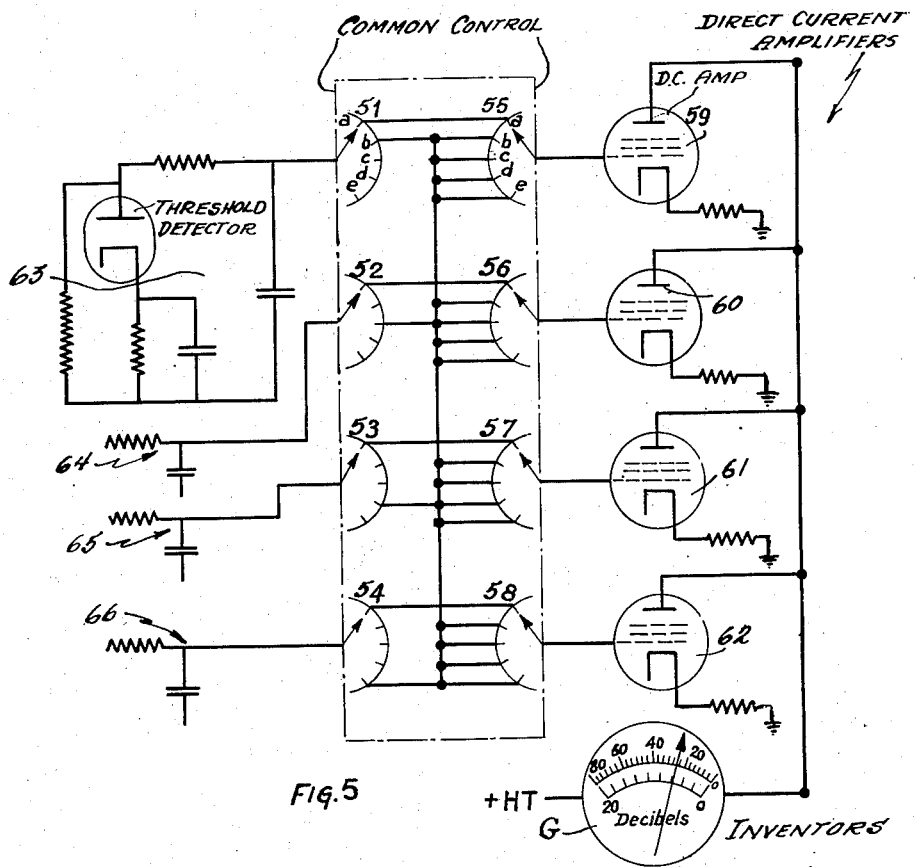

Finally Fig. 5 shows a plan of switching circuit allowing of increasing the precision of the voltmeter used as indicator.

As shown with reference to Fig. 1, 10, 20, 30 and 40 are the alternating current amplifier stages and 11, 21, 31 and 41 are the liminal detectors. 12, 22, 32 and 42 are the direct-current amplifiers. 23 and 33 are the limiters. G is the dial of the galvanometer used as indicator.

The initial amplifier stage 10 has a gain of $(20+Y)$ decibels when Y is determined as above indicated, each of the amplifier stages 20, 30 and 40 has a gain of 20 db.

As shown in Fig. 2 each liminal detector 11, 21, 31, 41 comprise a diode 1 the cathode 3 of which is brought to fixed positive bias $t$, for example $t=+0.5$ volt. The anode 2 of each diode is connected through a condenser and an input terminal J to the output of an alternating current amplifier, as liminal detector 11 is connected to the output of amplifier 10 in Fig. 1. Each direct current amplifier 12, 22, 32, 42 is constituted by a variable mu tube 5 the plate 7 of which is connected to the measuring galvanometer G. The cathode of the variable mu tube of the direct current amplifier is given a fixed bias $w$. The negative bias developed by the passage of the rectified current through the resistance 4, across the anode 2 of the diode 1, is transmitted through the filter network consisting of resistance $r$ and condenser C, to the grid 6 of the tube 5.

The anode current $I_a$ of the direct current amplifier tube 5 varies as a function of the negative bias of the grid as shown in Fig. 3a for constant plate voltage.

The direct current output of an amplifier such as 12 (Fig. 1) is a logarithmic function of the input excitation voltage $V_{exc}$ applied to it, as shown in Fig. 3b.

The total current, that is, the sum of the four partial currents from the four direct current amplifiers 12, 22, 32, 42, passing through the galvanometer with substantially linear characteristics shown in Fig. 3c is in semi-logarithmic ordinates.

The outputs of the four direct current amplifier stages are connected with a single wire 8 which passes through the galvanometer G, which thus indicates the sum I of the four individual currents $I_1$, $I_2$, $I_3$, and $I_4$, at the output of the four direct current amplifier stages, respectively. The values of these currents, with the exception of one of them, is either $I_M$ or zero, as has been previously explained. When plotted on the semi-logarithmic scale of Fig. 3a, the total current I passing through the galvanometer G is a straight line, as shown in this Figure 3c.

The duty of the limiters 23, 33 is to prevent the alternating current amplifiers placed after them as 30, 40 from being saturated when those placed before them take care of the maximum output voltage provided for. These limiters may be of any known type.

Figure 4:
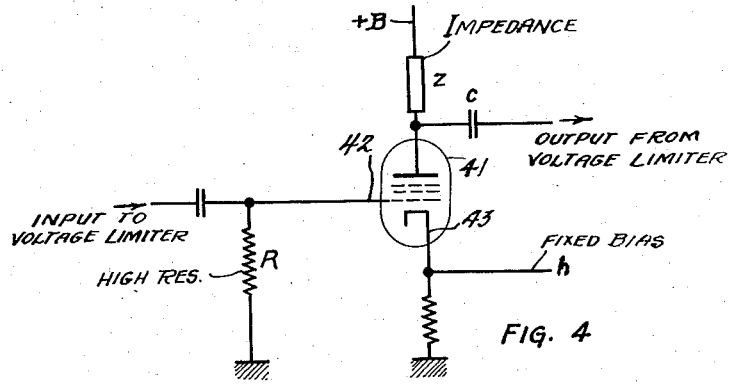
Fig. 4 is the circuit of a voltage limiter serving as a safety device.

These limiters 23, 33 may be constituted in particular as shown in Fig. 4 by a vacuum tube 41 the plate of which is connected to an impedance $z$ and the grid 42 of which is connected to earth through a high resistance R, and the cathode 43 of which is given a fixed bias $h$ determined by the operating conditions of the amplifier. When the alternating voltage applied to the grid exceeds $h$ as the peak value, the grid current brings about in the resistance R a voltage drop causing a negative bias of this grid 42, the amplification is reduced and the limiter transmits through the condenser C to the alternating current amplifier stage placed before it, (say the limiter 23 to the amplifier 30 for instance, Fig. 1,) a voltage which remains fixed at a peak value about equal to $h$.

No limiter is needed ahead of the amplifier 10 Fig. 1, because for the highest voltage to be measured, the amplifier 10 furnishes a peak voltage of $h$ volts which does not exceed the saturation limit of the devices placed immediately ahead of amplifier 10.

In the apparatus described the galvanometer deflections are reduced when the applied voltage increases. If it be desired to obtain deflections in the usual order of increasing values there will be applied to the galvanometer a constant compensation current equal to $4I_M$ from which will be substracted the current $I=I_1+I_2+I_3+I_4$.

In the preceding description it is assumed that the range of measurement extends over 80 decibels; if 160 points be marked on the dial of the apparatus, each will represent a half decibel.

According to another characteristic of this present invention, precision may be increased in the case in which the apparatus is used as an indicator and not as a recorder. For that purpose use is made of the circuit shown in Fig. 5.

As shown in Fig. 5 there are inserted between the detectors and the direct current amplifiers, the rotary selecting switches 51, 52, 53, 54, 55, 56, 57, and 58 each with 5 positions $a$, $b$, $c$, $d$, and $e$. These switches are connected mechanically to one drive shaft in such manner that all the sliding contacts are oriented invariably at the same position, the contacts of the different positions of the rotary switches being connected electrically together as shown in the Figure 5. The detectors are designated by numerals 63 to 66 and the direct current amplifiers by 59 to 62. The arrangement allows of applying the grids of the tubes of 59 to 62 to the detectors 13 to 66, or in parallel across the given detector.

Assume that it is desired, for instance, to measure the voltage level 34.7 decibels. Then the rotary switches all being on position $a$ a reading is effected under the same conditions as explained above; thus a value comprised between 34.5 and 35 decibels is read off on the dial. Then the rotary switches are placed on the position $d$, that is, the grids of the four variable mu tubes are placed in parallel across the anode of the active detector, 65 in this case. Then the total deflection of the dial of instrument G takes place for 20 decibels instead of for 80 decibels; if a second scale corresponding, and marked with 200 points, is provided on the dial then a tenth of a decibel can thus be measured. Thus in the case of a voltage of 34.7 decibels to be measured, the value 14.7 will be read on the scale, which gives for the level, the true value $20+14.7=34.7$ decibels.

The entire specific description given above to explain the constitution and manner of operation of the apparatus is based as stated upon a measurement range of 80 decibels; it is evident that for other values of $k$ and of $n$, the number of alternating current amplifier stage and of direct detector-amplifiers will be modified consequently as well as the gains of the amplifier stages.

In general, the ratio $k$ is determined by conferring upon the amplifier stages 20, 30, and so forth, on the one hand an amplification factor of $k$ and on the other hand on the bias of the liminal detector shown in Fig. 2, a value equal to $v/(k-1)$ $v$ being the absolute value of the variation of grid voltage causing the current of the direct current amplifier to pass from $I_M$ to a very small value $i$ as shown in Fig. 3a. In fact the output plate current passes from the maximum value $I_M$ to a negligible value $i$ for alternating current peak voltages applied to the detector varying from value $V_1$ to value $V_2$ such that $$\frac{V_1}{V_2}=k$$

the current starts to decrease for a value $V_2=v$. It reaches the negligible value $i$ for $$t_1=t+v=kV_2=kV$$

Therefore $t=v/(k-1)$ where $t$ is the fixed positive bias of the liminal detector.

In all cases the principle of the circuit arrangement and manner of operation of the apparatus remain identical.

In the case of change in the amplification tubes, the characteristics of the assembly of the apparatus may be retained through a particular regulation provided on the screen and the grid of each tube.

It will be apparent to those skilled in the art that our invention is susceptible of modifications to adapt the same to particular applications, and all such modifications which are within the scope of the appended claims we consider to be comprehended within the spirit of our invention.

What we claim is:

1. A voltmeter with logarithmic scale for the measurement of alternating voltages comprising an input alternating current amplifier to which the voltage to be measured is imparted; further alternating current amplifiers having equal gains and arranged in series and in series with the first mentioned amplifier; identical units each of which comprises a threshold detector and a direct current amplifier, one of said units being arranged in shunt at the output of each of said alternating current amplifiers including the input amplifier; the output rectified voltage of each threshold detector constituting the negative polarization voltage of the direct current amplifier associated with said detector; the direct current amplifiers having a characteristic curve "anode current-log. control grid voltage" comprising a sloping portion the larger part of which follows a rectilinear course, the sum of said anode currents varying itself in proportion to the logarithm of the voltage to be measured; a common circuit for feeding the anodes of the direct current amplifiers; and a galvanometer arranged in said circuit.

2. In a logarithmic scale vacuum tube voltmeter system, a plurality of amplifier stages connected in series, an input connection connected to the input of an initial said stage at the head of said series, the gains of all of said stages except said initial stage having the same predetermined value, an individual liminal detector connected to the output of each said stage, an individual direct current amplifier for each said detector having its input connected to the output of each said detector, and a galvanometer having a logarithmic scale connected to the outputs in parallel of all said direct current amplifiers, said detectors respectively having the same control liminal values, each said direct current amplifier comprising a variable mu tube having an anode current against control grid voltage characteristic which is substantially logarithmic.

3. A system according to claim 1, each said detector and the direct current amplifier connected thereto constituting an individual control unit, and each said control unit comprising a variable mu tube having an anode current against control grid voltage characteristic which is substantially logarithmic.

4. A system according to claim 2, and a voltage limiting device inserted in series between the input of the last said amplifier stage and the output of the immediately preceding said amplifier stage.

JACQUES SELZ.
ALEXANDRE DE LEUDEVILLE.

REFERENCES CITED

The following references are of record in the file of this patent:

UNITED STATES PATENTS

| Number | Name | Date |
|---|---|---|
| 2,406,882 | Young | Sept. 3, 1946 |
| 2,496,551 | Lawson et al. | Feb. 7, 1950 |